June 12, 1923.
P. C. AGEE
1,458,793
BRAKE ROD TAKE-UP
Filed Jan. 11, 1922
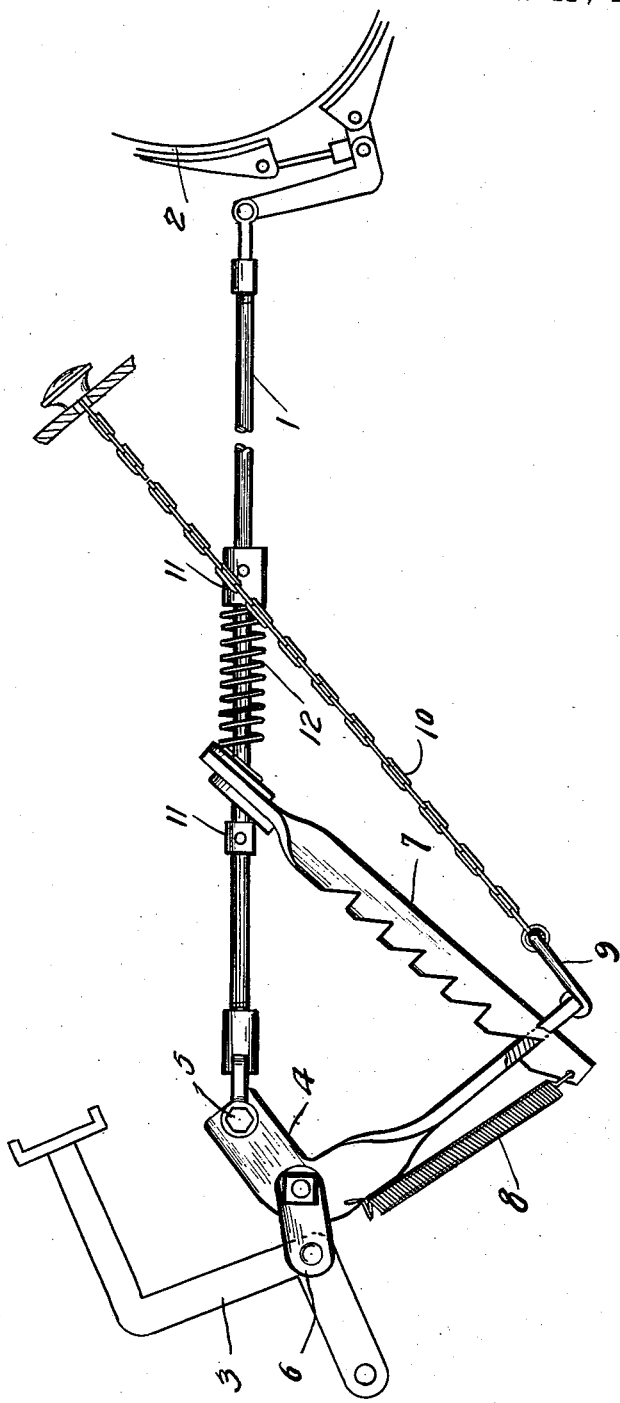
INVENTOR
P. C. Agee.
BY
ATTORNEY Patented June 12, 1923.

1,458,793

UNITED STATES PATENT OFFICE.

PHILIP C. AGEE, OF POMEROY, WASHINGTON.

BRAKE-ROD TAKE-UP.

Application filed January 11, 1922. Serial No. 528,425.

*To all whom it may concern:*

Be it known that I, PHILIP C. AGEE, a citizen of the United States, residing at Pomeroy, in the county of Garfield and State of Washington, have invented certain new and useful Improvements in Brake-Rod Take-Ups; and I do hereby declare the following to be a full, clear, and exact description of the invention, such as will enable others skilled in the art to which it appertains to make and use the same.

The primary object of this invention is the provision of means whereby the usual rod connecting a vehicle brake with the operating lever may be effectively shortened by the driver while the vehicle is in motion and without necessitating the driver to leave his seat thereby insuring application of the brake when required.

Considered generically, the invention may be applied to any connecting rod to admit of taking up wear or lost motion without requiring the stopping of the moving parts for the loosening and adjusting of the usual connecting means which ordinarily entails trouble and may not under various conditions be conveniently effected.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

As shown in the accompanying drawing, which is a diagrammatic view illustrative of the invention, the numeral 1 designates a brake rod which ordinarily connects the brake 2 with the operating lever 3. Obviously the part 1 may be a connecting rod between any two cooperating parts and which is required at times to be shortened or adjusted to compensate for wear. The operating lever 3 may be of any type adapted to be actuated by foot or hand. A lever 4 is pivoted at one end as at 5 to the rod 1 and is connected intermediate its ends with the operating lever 3, preferably by means of a link 6. A toothed bar 7 mounted on the rod 1 is adapted to adjustably engage the other end of the lever 4 and hold the latter in the required adjusted position. A contractile helical spring 8 connects the lower end of the toothed bar 7 with the lever 4 and normally tends to hold a tooth of the bar 7 in engagement with the lever 4. The lever 4 is preferably of elbow-form and the lower end of its long arm is slotted to receive the toothed bar 7. A link 9 or like connection is provided at the lower end of the lever 4 and a pull piece 10, such as a cord or chain, is connected thereto and extends within convenient reach of the driver's seat to be drawn upon when it is required to take up any play in the parts connected by the rod 1, whereby the brake may be effectively applied when required or the parts connected by means of the rod 1 properly function when the lever 3 is operated. Stop collars 11 are provided on the rod 1 and an expansible helical spring 12 is mounted on the rod 1 between the stop collars 11 and normally exerts a pressure upon the end of the toothed bar 7 loosely mounted upon the rod 1 between the stop collars 11.

What is claimed is:

1. In combination with two parts and an intermediate rod connected to one of said parts, a lever having pivotal connection at different points in its length with the other one of said parts and with the said rod, a bar loose on the said rod and having ratchet connection with the said lever, and operating means for adjusting the lever with reference to the said bar to vary the connection between the parts to be connected.

2. A connecting rod take up comprising a lever having pivotal connection with the connecting rod and freely operable, a toothed bar loose upon the connecting rod and in cooperative relation with the lever to hold the same in the required adjusted position, a spring connection between the toothed bar and lever for maintaining connection between said parts, and actuating means for the said lever.

3. In combination, a connecting rod, a lever pivoted thereto, a toothed bar loose upon the connecting rod and in co-operative relation with said lever to hold the same in the required adjusted position, a spring connection between the toothed bar and lever, a second spring connection between the toothed bar and connecting rod, and means extending from said lever to a convenient point of operation whereby the said lever may be adjusted from a distant point.

In testimony whereof I affix my signature in presence of two witnesses.

PHILIP C. AGEE.

Witnesses:
A. G. FARLEY.
A. W. HENDER.